(12) United States Patent
Bauer (10) Patent No.: US 10,466,678 B2
(45) Date of Patent: Nov. 5, 2019

(54) MACHINE MAINTENANCE USING A SERVICE COMPUTER

(71) Applicant: TRUMPF Werkzeugmaschinen GmbH + Co. KG, Ditzingen (DE)

(72) Inventor: Klaus Bauer, Ditzingen (DE)

(73) Assignee: TRUMPF Werkzeugmaschinen GmbH + Co. KG, Ditzingen (DE)

( * ) Notice: Subject to any disclaimer, the term of this patent is extended or adjusted under 35 U.S.C. 154(b) by 700 days.

(21) Appl. No.: 14/511,985

(22) Filed: Oct. 10, 2014

(65) Prior Publication Data

US 2015/0032248 A1    Jan. 29, 2015

Related U.S. Application Data

(63) Continuation of application No. PCT/EP2013/001040, filed on Apr. 9, 2013.

(30) Foreign Application Priority Data

Apr. 11, 2012  (DE) .................. 10 2012 205 907

(51) Int. Cl.
*G05B 19/4065* (2006.01)
*G06F 9/455* (2018.01)
*G05B 19/042* (2006.01)

(52) U.S. Cl.
CPC ..... *G05B 19/4065* (2013.01); *G05B 19/0428* (2013.01); *G06F 9/45533* (2013.01); *G05B 2219/49305* (2013.01)

(58) Field of Classification Search
CPC ...... G05B 19/4065; G05B 2219/49305; G06F 9/45533
See application file for complete search history.

(56) References Cited

U.S. PATENT DOCUMENTS 8,387,048 B1 *  2/2013  Grechishkin ....... G06F 9/45533
                                                        718/1
2004/0215772 A1 * 10/2004  Dinker ................ H04L 29/06
                                                        709/225

(Continued)

FOREIGN PATENT DOCUMENTS

CN      102202289 A     9/2011
DE    102007030396 A1   1/2009

(Continued)

OTHER PUBLICATIONS

Karnouskos et al., "Toward an Architecture for Service-Oriented Process Monitoring and Control", 36th Annual Conference on IEEE Industrial Electronics Society, IEEE, Nov. 7, 2010, pp. 1385-1391.

(Continued)

*Primary Examiner* — Umut Onat
(74) *Attorney, Agent, or Firm* — Fish & Richardson P.C.

(57) ABSTRACT

Methods, devices and systems for machine maintenance using a service computer, particularly using different maintenance applications feature at least one machine controller configured to control an associated machine and a computing system defining at least one virtual machine and comprising at least one application server on which is installed application software for at least one of the machine controller or the associated machine. The machine controller is connectable with the virtual machine via a first communication link so as to enable remote communication between the virtual machine of the computer and the machine controller. The virtual machine is connectable with the application server via a further communication link by a remote-desktop-protocol, such that at least one of the application server and the application software installed on the application server is operable via the virtual machine.

24 Claims, 4 Drawing Sheets

(56) References Cited

U.S. PATENT DOCUMENTS

| | | |
|---|---|---|
| 2004/0230970 A1 | 11/2004 | Janzen |
| 2006/0089992 A1 | 4/2006 | Blaho |
| 2008/0091794 A1* | 4/2008 | Thieringer ............ G05B 19/042 709/217 |
| 2008/0127348 A1 | 5/2008 | Largman et al. |
| 2009/0282404 A1* | 11/2009 | Khandekar ......... G06F 9/45558 718/1 |
| 2010/0154051 A1* | 6/2010 | Bauer ................. G06F 9/45533 726/15 |
| 2010/0223323 A1* | 9/2010 | Bhayani .................. G06F 9/455 709/203 |
| 2011/0153838 A1* | 6/2011 | Belkine .................. G06F 9/505 709/227 |
| 2012/0079607 A1* | 3/2012 | Lal .......................... G06F 21/10 726/29 |
| 2012/0110572 A1* | 5/2012 | Kodi .................. G06F 9/45558 718/1 |

FOREIGN PATENT DOCUMENTS

| | | |
|---|---|---|
| DE | 102008030317 A1 | 12/2009 |
| EP | 1715395 A1 | 11/1991 |
| WO | WO2010102875 A1 | 9/2010 |

OTHER PUBLICATIONS

International Search Report from corresponding PCT Application No. PCT/EP2013/001040, dated Sep. 24, 2013, 4 pages.

\* cited by examiner

Fig. 1

(prior art)

MACHINE MAINTENANCE USING A SERVICE COMPUTER

CROSS-REFERENCE TO RELATED APPLICATION

This application is a continuation of and claims priority under 35 U.S.C. § 120 to PCT Application No. PCT/EP2013/001040 filed on Apr. 9, 2013, which claimed priority to German Application No. DE 10 2012 205 907.5, filed on Apr. 11, 2012. The contents of both of these priority applications are hereby incorporated by reference in their entirety.

TECHNICAL FIELD

The invention relates to methods, devices and systems for machine maintenance using a service computer, particularly using different maintenance applications.

BACKGROUND

The global orientation of today's machine manufacturers with clients/machine users located worldwide demands to be able to perform maintenance, fault detection and also repairs of the machine not only directly on site, but increasingly via remote access. In that application, under the term "machines" all machine facilities are summarized, e.g., for machining via laser, for punching or bending, and devices as, e.g., laser beam sources, plasma generators or induction generators. Dial-in directly from a service computer via an analogue modem or an ISDN-connection to a machine as it was common in the past will be replaced by recent communication technologies, especially by the so called Virtual Private Network (abbreviated VPN) allowing an encrypted remote access via the Internet. A remote access via VPN puts high requirements on the infrastructure and safety. The fact that the remote access via VPN is dependent on the technology applied by the machine operator is particularly problematic. A simple universal solution on the side of the machine manufacturer is thereby hindered that it is hitherto not possible to apply different VPN-software simultaneously within one operating system, e.g., on a service computer.

A system and a method for remote communication between a central computer and a machine controller are known from the European patent application EP 1 715 395 A1. The known remote communication system 1 shown in FIG. 1 comprises a central computer 5 which is protected by a firewall 6 to the outside. Several virtual machines 7 are installed on the central computer 5 which are executable simultaneously and can have different operating systems and application programs especially telepresence programs and antivirus programs. For each machine controller 3 there is a specific configured virtual machine 7 over which a communication link 8 will be established from the central computer 5 to the machine controller 3. The service computer 2 is not directly connected to the machine controller 3, but the connection of the service computer 2 is effected via the central computer 5 which is connected with the service computer 2 via a communication link 9. In a database 10 connected with the central computer 5 all data (dial-in technology, passwords, VPN-software) about the client and the machine 4 is stored. The central computer 5 determines the assigned communication link 8 on the basis of the data stored in the database 10 and the assigned virtual machine 7 and establishes the communication link 8 from the virtual machine 7 to the machine controller 3. The communication link 9 between the service computer 2 and the central computer 5 as well as the communication link 8 between the central computer 5 and the machine controller 3 are effected via the Internet 11, e.g., via a protected VPN-connection.

Figure 1:
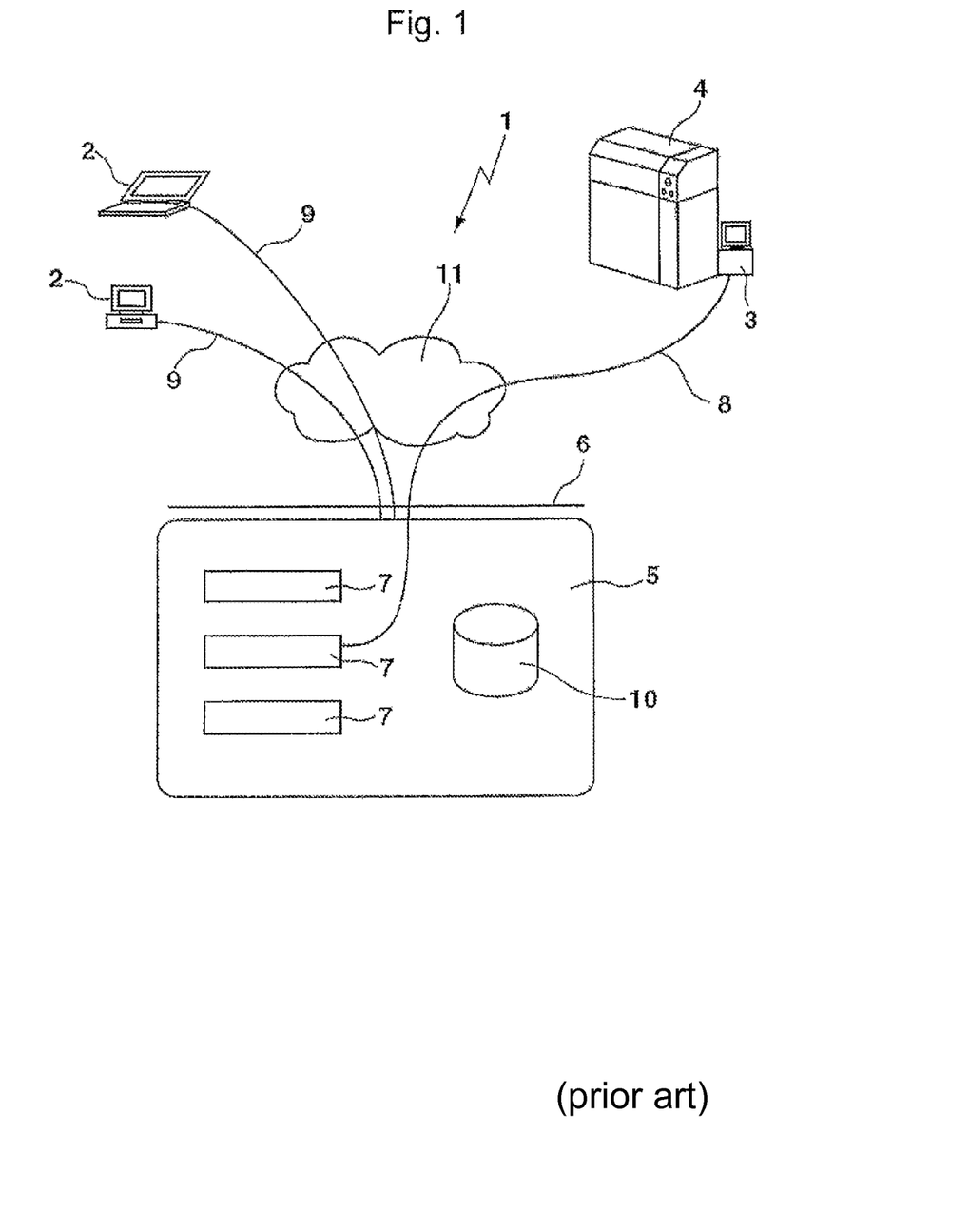
FIG. 1 shows a remote communication system between a service computer and a machine controller by interposition of a central computer.

For remote access to a machine controller 3 of the machine 4 a service person at first prepares the communication link 9 between his service computer 2 and the central computer 5. On the basis of the data stored in the database 10, the central computer 5 determines the communication link 8 which is assigned to the machine controller 3 and selects the executable virtual machine 7 which is adapted to the machine controller 3 and the communication link 8 for the connection with the machine controller 3 and starts that virtual machine 7. The service person performs functions of the machine controller 3 via the communication link 8 or exchanges data between the machine controller 3 and the central computer 5.

A further advancement of the system and the method for remote communication from EP 1 715 395 A1 is known from DE 10 2008 030 317 A1. There it is disclosed that the executable virtual machine 7 is not permanently stored in the central computer 5, but virtual machine templates designed for different kinds of machine controllers and communication links. If required an executable virtual machine 7 is started and used as an executable embedded copy of that virtual machine template which is adapted to the respective machine controller and the respective communication link. After termination of the executable virtual machine 7 the executable embedded copy can be deleted.

It is a consequence of that system, that by the fact that the required maintenance software has to be provided in each virtual machine or machine template separately, here it comes to redundant application and data management. That leads to the result that for the virtual machine template, on the one hand large amounts of data have to be stored on the central computer, and on the other hand, because of the complexity of the virtual machine template, long starting times of the executable virtual machine 7 are to be expected. Further, for each of the virtual machine templates including a certain software required for maintenance, corresponding software updates have to be executed often to keep the environment up to date. That, in turn, leads to high maintenance effort.

SUMMARY

One aspect of the invention features a system for remote communication between a computing system and at least one machine controller. The system includes at least one machine controller via which a machine can be controlled and a computing system defining at least one virtual machine and having at least one application server on which application software for operation or for maintenance of the machine controller or the machine is installed. The machine controller can be connected with the virtual machine such that a remote communication between the virtual machine and the machine controller can be established, and the virtual machine can be connected with the application server via a further communication link by means of a remote-desktop-protocol such that the application server or the application software which is installed on the application server can be operated via the virtual machine.

By the use of the system, required maintenance effort can be reduced, the amount of data can be narrowed, and/or the complexity of the system can be decreased. By the use of that structure, the application software can be limited to one installation at the application server and the maintenance effort can be limited correspondingly. Alternatively or additionally it is achieved that application software can be used which is not compatible with the system of the virtual machine and therefore not installable on that.

The computing system can include a central computer defining the at least one virtual machine is provided and an additional computer configured to function as the at least one application server.

In some implementations, the computing system includes a central computer defining at least one virtual machine and also defining a further virtual machine configured to function as the at least one application server, on which application software for operation or for maintenance of the machine controller or the machine is installed. The machine controller can be connected to the virtual machine via a first communication link such that a remote communication between the virtual machine and the machine controller can be ensured and the virtual machine can be connected to the application server via a further communication link by means of a remote-desktop-protocol such that the application server or the application software installed at the application server is operatable via the virtual machine.

Another aspect of the invention features a method for remote communication between a central computer and at least one machine controller for a machine is disclosed. The method includes: establishing a first communication link between the machine controller and a virtual machine provided on the central computer, establishing of a further communication link between the virtual machine and an application server via a remote-desktop-protocol, and operating of application software installed on the application server by the virtual machine, the application software being configured to operate or maintain at least one of the machine controller or the machine.

Other advantages and advantageous embodiments of the subject-matter of the invention will be appreciated from the description, the claims and the drawings. The features mentioned above and those set out below may also be used individually per se or together in any combination. The embodiment shown and described is not intended to be understood to be a conclusive listing but is instead of exemplary character for describing the invention.

DETAILED DESCRIPTION

Figure 2:
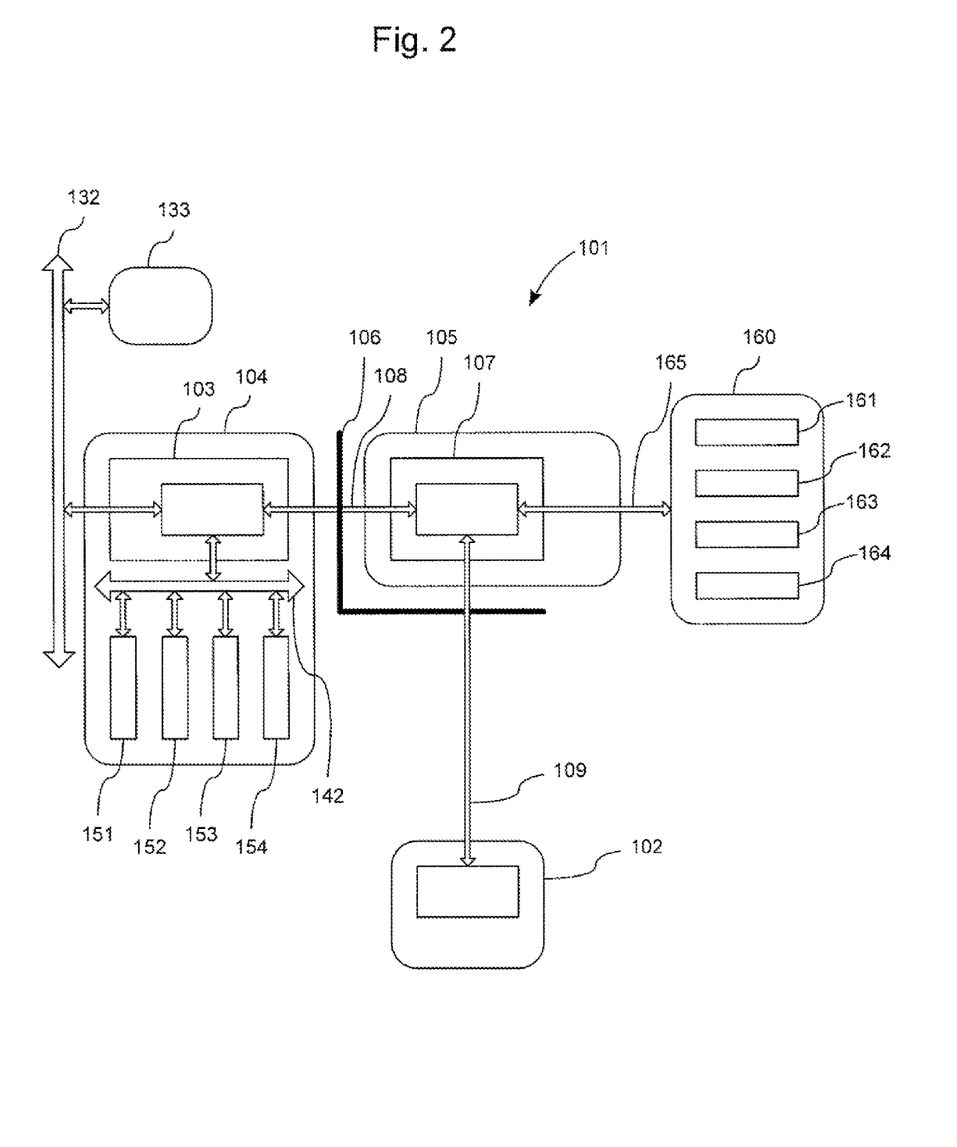
FIG. 2 shows a first embodiment of a system for remote communication.

In FIG. 2 a first embodiment of a system 101 for remote communication between a service computer 102, a central computer 105 and a machine controller 103 of a machine 104 is described.

The machine 104 is a machine tool or a machining unit, e.g., for laser machining, for punching or bending, and devices like, e.g., laser beam sources, plasma generators or induction generators or another machine for manipulation of a workpiece. The machine 104 includes a machine controller 103 and an internal machine communication network 142 via which data communication and control operations between the machine controller 103 and a numeric control (NC) or Programmable Logic Controller (PLC) 151 or further technical controllers 152, 153 and 154 will be performed.

The machine controller 103 is an electronic data processing device, e.g., an industrial PC via which the machine tool 104 can be programmed, operated and maintained and which monitors the operation of the machine tool. The machine controller 103 is connected with a communication network 132, e.g., a communication network of the machine user which is operated on the basis of Ethernet for in-house data transmission and data processing. Via the communication network 132 the machine controller 103 is able to access data processing devices 133 which are connected via the communication network 132. On the machine controller 103 application software is installed, which is able to display the content of the desktop of remote computers and which allows to operate the remote computers by means of the Remote-Desktop-Protocol (RDP). On the one hand, i.a. graphical user interface information of the remote computer is transmitted to the machine controller 103 such that either the entire screen surface of the remote computer, or only the image information of single programs of the remote computer, are displayed on the machine controller. On the other hand, user interface input information, for example via mouse or keyboard, is transmitted from the machine controller 103 to the remote computer such that the remote computer or a remote application software can be operated from the machine controller.

The use of the Remote-Desktop-Protocol is not required necessarily. Other protocols can be used which have similar functionality, like for example the "Independent Computing Architecture" (ICA), "Remote Frame Buffer" (RFB) or others. Protocols like that allowing the access to graphical user interfaces of operating systems or remote application software on remote computers by that they transmit pixel information of an operating system or an application on a remote computer in one direction to a user computer and input information like mouse movement or keyboard input from the user computer to the remote computer in the opposite direction, are called foreign desktop protocols in the following.

The service computer 102 is an electronic data processing device, e.g., a laptop which is usable for conventional data processing. The service computer 102 is connected with a communication network 122 (not shown in FIG. 2), e.g., a communication network of the machine manufacturer which is operated on the basis of Ethernet for in-house data transmitting and data processing. Alternatively the service computer 102 can be connected with a wide-area network like the Internet as well. Application software is installed on the service computer 102, which is able to display the content of desktops of remote computers and which permits operating the remote computers via Remote-Desktop-Protocol (RDP). Other foreign desktop protocols are possible.

The central computer 105 is an electronic data processing device which implements a tele presence system. For example, a "TRUMPF-Internet-Teleprasenz-Portal" can be installed on the central computer 105. In such a system a host operating system is installed on the central computer 105. In the embodiment, the host operating system can be a LINUX-based operating system. Via a hypervisor, a specific kind of software for virtualization, an environment for virtual machines is provided. In this embodiment, as the hypervisor, a VM-product of the manufacturer VMWARE Inc. can be used. Alternatively, a so called "bare metal hypervisor" can be used, which is executable on the central computer 105 without an underlying complete host operating system.

One or more virtual machines 107 can be operated on the hypervisor in parallel. A virtual machine 107 is an environment in which interfaces are provided to a guest operating system which allows the guest operating system to perform as it is installed on an own device and operated on that without an underlying hypervisor. On the central computer, virtual machine templates adapted to the respective operating system and the respective operating software of the machine controller 103 are stored. The virtual machine template is designed such that a virtual machine made thereof can be connected via a first communication link 108 with the machine controller 103. The actual remote access to the machine controller 103 occurs via a virtual machine 107 generated by copying the machine template suitable to the machine controller 103. In the embodiment, MICROSOFT WINDOWNS XP can be used as a guest operating system. This provides the possibility for other computers to access the desktop, applications and data of the guest operating system via the Remote-Desktop-Protocol via the included service "Terminal Services". Other guest operating systems are possible as well which are able to provide that functionality either by their own or via programs. Furthermore, application software is installed on the virtual machine 107 allowing a remote access to remote computers or remote applications by means of a foreign-desktop-protocol—RDP in the case of the embodiment. Additionally, maintenance software and operation software for the machine controller 103 or the machine 104 can be installed on the virtual machine 107.

Between the virtual machine 107 and the machine controller 103 the first communication link 108 can be established. In the embodiment, that connection can be provided via the Internet. For protecting the first communication link 108, implemented via an encrypted tunnel and so, a VPN-connection can be established.

Between the virtual machine 107 and the service computer 102, a second communication link 109 is established. In the embodiment, that connection can be established via an internal communication network of the machine manufacturer. The second communication link 109 can also be established via the Internet and protected via a VPN-tunnel.

The first and the second communication links 108, 109 from and to the central computer 102 are isolated via a firewall 106 so that no direct connection is possible between the service computer 102 and the machine controller 103. That means that on each layer of the ISO-OSI-reference model, no direct protocol connections are possible between the instances of these layers on the service computer 102 and the machine controller 103. Via the second communication link 109, a connection with the virtual machine 107 is established via the Remote-Desktop-Protocol in such a way that by use of the service computer 102, the application software installed on the virtual machine 107 can be operated.

The application server 160 is an electronic data processing device, e.g., a conventional PC, on which a server operating system is installed, for example, Windows 2008 R2. That operating system allows access to desktop, applications and data of the server operating system by means of the service "terminal services" and RDP for other computers, via the Remote-Desktop-Protocol. On the application server 160 several application software is installed, e.g., a number of diagnostic tools 161, 162, 163, application software for machine programming 164 or further application software necessary or desired for the operation or the maintenance of the machine 104 or the machine controller 103.

Between the virtual machine 107 and the application server 160 a third communication link 165 is established. In the embodiment, that connection can occur via an internal communication network of the machine manufacturer which can be the same as the communication network of the second communication link 109. Via the third communication link 165 a connection between the virtual machine 107 and the application server 160 is established via the Remote-Desktop-Protocol in such a way that via the virtual machine 107 the application software installed on the application server can be operated. Further, the input/output operations are forwarded to the application server 160 and the peripheral devices connected to the application server 160 via RDP to the virtual machine in such a way that the resources of the application server 160 are incorporated in the guest system of the virtual machine 107, comparable with own resources. Thus, the application software installed on the application server 160 can be accessed via the virtual machine 107. In particular, the application software 161, 162, 163, 164 installed on the application server 160 can access local resources of the virtual machine 107 as if it is installed on the virtual machine 107 locally. Local resources are, for example, network connections, data storage media, and/or connected hardware or resources of the machine controller 103 locally embedded in the virtual machine 107 via RDP, e.g., network connections and data storage media of the machine controller or sensors, actuators and other hardware of the machine 104 which can be accessed from the machine controller 103.

Between the virtual machine 107 and the service computer 102 a second communication link 109 is established. In the embodiment that connection can occur via an internal communication network of the machine manufacturer. The second communication link 109 can also be established via the Internet and protected via a VPN-tunnel.

Via the second communication link by means of the Remote-Desktop-Protocol a connection with the virtual machine 107 is established in that way that, via the service computer 102, the application software installed on the virtual machine, in particular the application software for using a foreign-desktop-protocol, can be operated. It is possible to access the application software which is installed on the application server 160 and to operate the software as it is installed on the service computer 102 from the service computer 102 via the second communication link 109, the virtual machine 107 and the third communication link 165.

Further, it is possible to access the application software installed on the application server 160 from the machine controller 103 via the first communication link 108, the virtual machine 107 and the third communication link 165 as if it is installed locally on the machine controller 103. In particular, the application software 161, 162, 163, 164 installed on the application server 160 has access to local resources of the machine controller 103 in that way as if they are installed on the machine controller 103 locally. Local resources are, for example, network links and data storage media of the machine controller 103, or sensors, actuators and other hardware of the machine 104 which can be accessed from the machine controller 103.

The structure of the first embodiment has the benefit that the computing work load can be removed from the central computer 105 to the application server 160 and thereby less demands are made on the resources of the central computer 105. Further, the application software is installed only once on the application server 160 and available in the different virtual machine templates 107' and virtual machines 107 via foreign-desktop-protocols. That means that this software no longer has to be installed and provided in each virtual machine template; wherefore the software installation has to be maintained and updated only once at central position and no longer in each virtual machine template.

Figure 3:
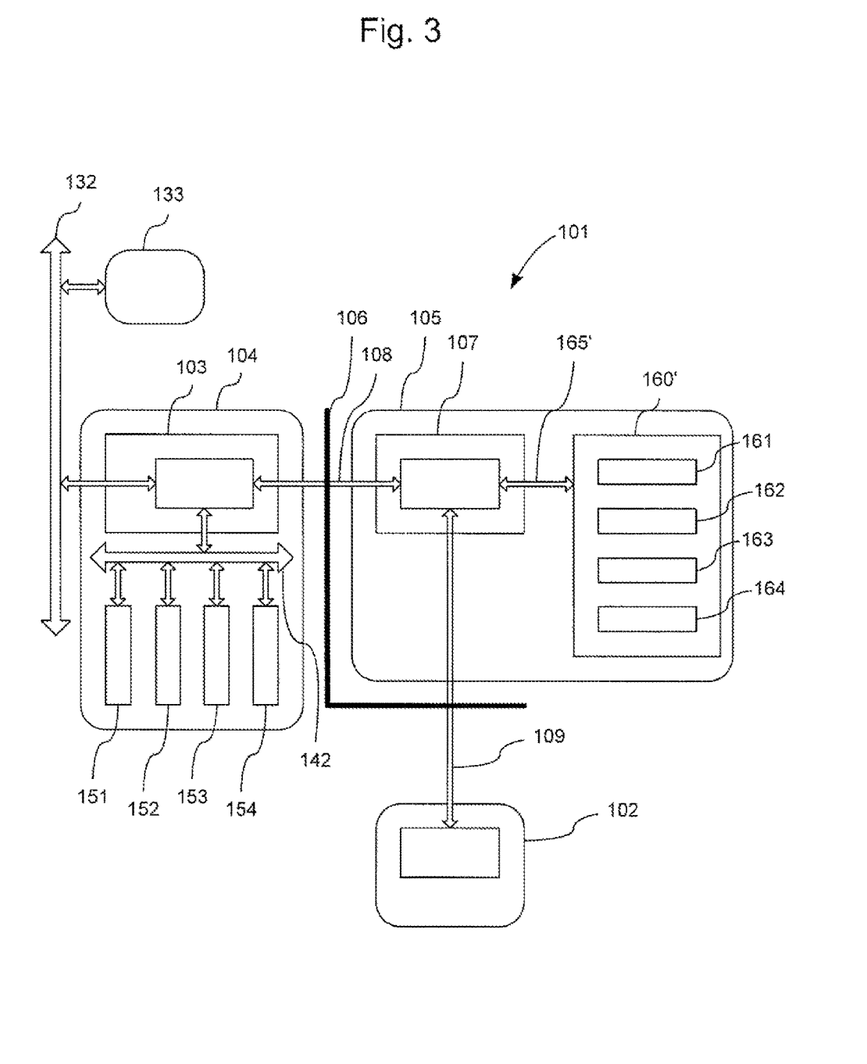
FIG. 3 shows a second embodiment of the system for remote communication.

In FIG. 3 a second embodiment of the system 101 is shown. The second embodiment differs from the first embodiment only by that the application server 160 is no separate electronic data processing device, but it is executable itself as a virtual machine 160' on the hypervisor of the central computer. The third communication link 165' it not an internal communication network of the machine manufacturer, but a virtual connection between the virtual machine 107 and the virtual machine 160' of the application server.

The system of the second embodiment has the benefit that the system is simplified at the site of the device by omitting a separate device for the application server 160. Further, the system of the second embodiment has the benefits of the first embodiment regarding to simplify the maintainability of the virtual machine templates and the virtual machine 107.

Figure 4:
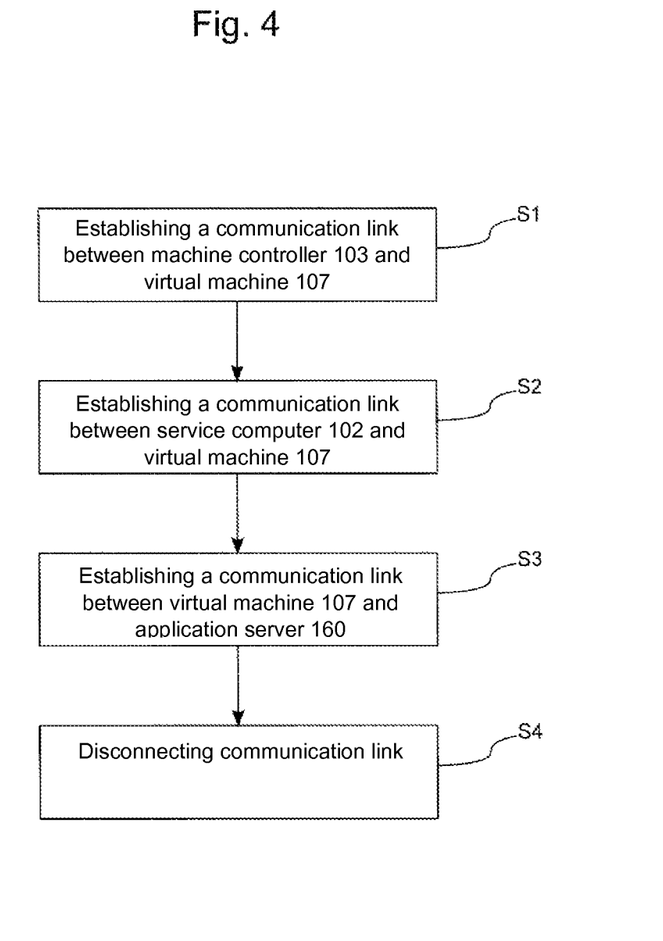
FIG. 4 shows an example method for remote communication.

FIG. 4 shows a method for remote communication for machine maintenance. In a first link establishing step S1, there is established a link between the machine controller 103 and the virtual machine 107. For that, first of all a copy of a suitable virtual machine template is created on the central computer 105 and, on the basis of the copy, the virtual machine 107 is started. Hereupon, the first communication link 108 is established via the Internet between the virtual machine 107 and the machine controller 103. The first communication link can be protected via a VPN-tunnel.

In a second link establishing step S2, the second communication link between the virtual machine 107 and the service computer 102 is established. Especially when the virtual machine 107 and the service computer 102 are not in the same protected network, that communication link can be protected via a VPN-tunnel. The second communication link may occur via both, an Ethernet based internal communication network of the machine manufacturer or the Internet as well. When establishing the second communication link, the protocol RDP can be used. The second communication link 109 is configured in that way, that application software installed on the application server 160, 160' or the virtual machine 107 is integrable into the service computer 102.

In a link establishing step S3, the third communication link between the virtual machine 107 and the application server 160, 160' is established. The third communication link 165, 165' may occur via both, an Ethernet based internal communication network of the machine manufacturer, or a virtual connection inside of the service computer 105 as well. When establishing the third communication link, the protocol RDP is used. The third communication link 165 is configured so that application software installed on the application server 160, 160' is integrable into the virtual machine.

If the connection is established in the method, the application software installed on the application server 160 for maintaining or operating the machine 104 can be used via the service computer 102.

In a modified step S1, the first link is established by means of RDP as well, so that the application software installed on the application server 160 for machine maintenance and operation is used by the machine controller 103 as well. Especially the application software installed on the application server 160 accesses local resources of the machine controller 103 in such a way as if it is installed locally. Local resources are, e.g., network links and data storage media of the machine controller 103, or sensors, actuators and other hardware of the machine 104 which can be accessed by the machine controller 103.

This has the benefit that the requirements of the software for processing performance in not settled on the machine controller 103 which is typically in use for many years and therefore possibly does not offer sufficient resources any more for running a still up-to-date application software for machine maintenance and machine operating.

Further, depending on implementation, as an additional or alternative benefit, the installation of software updates on the machine controller 103 is avoided, which is especially expensive, since the operating system of the machine controller 103 is typically hardened by, e.g., shutting down of services or locking of interfaces for preventing undesired or damaging changes of the system. However, these arrangements typically resulting in a removal of functionality are complicating desired software updates as well.

Further, depending on implementation, additional or alternative benefits of application software, which is no longer installed direct on the machine controller 103, consist in that duplicating of unlicensed application software is impeded and that a machine operator is no longer executing application software for machine maintaining and machine operating on his own, by which it is, e.g., possible to disable functions relevant for safety or to damage the machine 104 in case of incorrect usage. Rather, the access on application software executed on the application server 160 can, e.g., be restricted so that the software is only able to access resources of the machine controller 103 when service personnel supervise the execution of the application or decides the execution of the application by means of logging in on the central computer 105 with the service computer 102.

In a finishing step S4, the first communication link 108, the second communication link 109 and the third communication link 165 are disconnected and the virtual machine 107 is erased. The erasing of the virtual machine 107 can occur automatically in case of that neither the first communication link 108, the second communication link 109 nor the third communication link 165 are active, or one of the three communication links is not active for an adjustable period of time.

The embodiments shown and described ought not to be understood as a conclusive enumeration, but have rather exemplary nature for explaining the invention. Thus, in the embodiment, the central computer is connected to the communication network of the machine manufacturer. But the central computer can also be accommodated and operated at an external service provider. The same applies for the application server.

In the embodiment the transmission protocol RDP is used as an example. Alternatively to that, other foreign-desktop-protocols can be used. The sentential connectives "and", "or" and "either . . . or" are used in the meaning which leans on the logical conjunction, the logical inclusive disjunctions (often "and/or"), and the logical exclusive disjunctions, respectively.

A number of embodiments of the invention have been described. Nevertheless, it will be understood that various modifications may be made without departing from the spirit and scope of the invention. Accordingly, other embodiments are within the scope of the following claims.

What is claimed is:

1. A remote communication system comprising:
   at least one machine controller configured to control an associated machine; and
   a computing system defining at least one virtual machine and comprising at least one application server on which is installed application software for at least one of the machine controller and the associated machine,
   wherein the machine controller is connectable with the virtual machine via a first communication link so as to enable remote communication between the virtual machine of the computing system and the machine controller, and
   wherein the virtual machine is separated from the application server and connectable with the application server via a further communication link by a foreign-desktop-protocol, such that the application software installed on the application server is accessible by the virtual machine via the foreign-desktop-protocol and is at least partially integrable into the virtual machine and operable by the virtual machine, without installation of the application software on the virtual machine.

2. The system of claim 1, wherein the computing system comprises:
   a central computer defining the at least one virtual machine; and
   an additional computer configured to function as the at least one application server.

3. The system of claim 1, wherein the computing system comprises a central computer defining the at least one virtual machine and also defining a further virtual machine configured to function as the at least one application server.

4. The system of claim 1, wherein the application software is installed on the at least one application server, the application software configured to enable operation or maintenance of the machine controller or the machine.

5. The system of claim 1, wherein the further communication link is configured to enable input/output operations at the application server to be redirected from/to the virtual machine so that the application software installed on the application server emulates software locally installed on the virtual machine.

6. The system of claim 5, wherein the further communication link is arranged such that the application software installed on the application server is configured to access local or locally embedded resources of the virtual machine.

7. A remote communication system comprising:
   at least one machine controller configured to control an associated machine;
   a computing system defining at least one virtual machine and comprising at least one application server on which is installed application software for at least one of the machine controller and the associated machine, wherein the machine controller is connectable with the virtual machine via a first communication link so as to enable remote communication between the virtual machine of the computing system and the machine controller, and wherein the virtual machine is separated from the application server and connectable with the application server via a further communication link by a foreign-desktop-protocol, such that the application software installed on the application server is accessible by the virtual machine via the foreign-desktop-protocol and is at least partially integrable into the virtual machine and operable by the virtual machine, without installation of the application software on the virtual machine; and
   at least one service computer connectable with the virtual machine via a second communication link by a foreign-desktop-protocol, enabling operation of the virtual machine or application software installed on the virtual machine via the service computer,
   wherein the service computer is different from the application server and the second communication link is different from the further communication link.

8. The system of claim 7, wherein the second communication link occurs via the foreign-desktop-protocol, enabling input/output operations to the virtual machine to be redirected from/to the service computer so that the application software installed on the virtual machine or the application software of the application server embedded in the virtual machine emulates software locally installed on the service computer.

9. The system of claim 7, wherein at least one of the first communication link and the second communication link occurs via a protected Virtual Private Network (VPN)-connection.

10. The system of claim 7, wherein the first communication link occurs via the foreign-desktop-protocol, enabling input/output operations to the virtual machine to be redirected from/to the machine controller, such that application software installed on the virtual machine or the application software of the application server embedded in the virtual machine emulates software locally installed on the machine controller.

11. The system of claim 10, wherein the first communication link is configured such that at least one of the application software installed on the application server and the application software installed on the virtual machine is able to access local or locally embedded resources of the machine controller.

12. The system of claim 7, wherein the computing system defines a plurality of virtual machines, and wherein each virtual machine of the computing system is defined by an executably embedded copy of a respective virtual machine template.

13. The system of claim 12, wherein each of the virtual machine templates is defined by a corresponding set of application software installed on the virtual machine and application software installed on the application server and embedded in the virtual machine.

14. A method of remotely communicating between a computing system and at least one machine controller for a machine, the method comprising:
   establishing a first communication link between the machine controller and a virtual machine defined by the computing system;
   establishing a further communication link between the virtual machine and an application server defined by the computing system and separated from the virtual machine, via a foreign-desktop-protocol, such that the application software installed on the application server is accessible by the virtual machine via the foreign-desktop-protocol and is at least partially integrable into the virtual machine and operable by the virtual machine, without installation of the application software on the virtual machine; and
   operating the application software installed on the application server by the virtual machine defined by the computing system, thereby operating or maintaining at least one of the machine controller and the machine.

15. The method of claim 14, wherein the first communication link is established by a foreign-desktop-protocol in which input/output operations to the virtual machine are redirected from/to the machine controller, such that the application software installed on the virtual machine or the application software of the application server embedded in the virtual machine emulates software locally installed on the machine controller.

16. The method of claim 14, further comprising:
    establishing a second communication link between a service computer and the virtual machine by a foreign-desktop-protocol; and
    operating application software installed on the virtual machine, or the application software installed on the application server embedded in the virtual machine, by the service computer.

17. The method of claim 16, wherein the second communication link occurs via a foreign-desktop-protocol, enabling input/output operations to the virtual machine to be redirected from/to the service computer, such that the application software installed on the virtual machine or the application software of the application server embedded in the virtual machine emulates software locally installed on the service computer.

18. The method of claim 16, wherein at least one of the first communication link and the second communication link occurs via a protected Virtual Private Network (VPN)-connection.

19. The method of claim 14, wherein the computing system comprises:
    a central computer defining the at least one virtual machine; and
    an additional computer configured to function as the at least one application server.

20. The method of claim 14, wherein the computing system comprises a central computer defining the at least one virtual machine and also defining a further virtual machine configured to function as the at least one application server.

21. A remote communication system comprising:
    at least one machine controller configured to control an associated machine; and
    a computing system defining a plurality of virtual machines and comprising at least one application server on which is installed application software for at least one of the machine controller and the associated machine,
    wherein the machine controller is connectable with a corresponding virtual machine of the plurality of virtual machines via a first communication link so as to enable remote communication between the corresponding virtual machine and the machine controller, and
    wherein each of the plurality of virtual machines is separated from the application server and connectable with the application server via a further communication link by a foreign-desktop-protocol, such that the application software installed on the application server is accessible by at least two of the plurality of virtual machines via the foreign-desktop-protocol and is at least partially integrable into the at least two of the plurality of virtual machines and operable by the at least two of the plurality of virtual machines, without installation of the application software on the at least two of the plurality of virtual machines.

22. The system of claim 1, wherein the application software installed on the application server is operable by the virtual machine to access resources locally embedded in the virtual machine, and wherein the resources comprise particular resources associated with at least one of the machine controller and the machine.

23. The system of claim 1, wherein the machine controller is accessible to the application software installed on the application server via the first communication link, the virtual machine, and the further communication link.

24. The system of claim 1, wherein the computing system defines a plurality of virtual machines, and wherein the application software installed on the application server is at least partially integrable into the at least two of the plurality of virtual machines and operable by the at least two of the plurality of virtual machines.

\* \* \* \* \*